(12) United States Patent
Tarui et al.

(10) Patent No.: US 12,533,337 B2
(45) Date of Patent: Jan. 27, 2026

(54) PHARMACEUTICAL DRUG CONTAINING HETEROCYCLIDENE ACETAMIDE DERIVATIVE

(71) Applicants: SENJU PHARMACEUTICAL CO., LTD., Osaka (JP); MOCHIDA PHARMACEUTICAL CO., LTD., Tokyo (JP)

(72) Inventors: Takeshi Tarui, Osaka (JP); Shinya Kobayashi, Osaka (JP)

(73) Assignees: SENJU PHARMACEUTICAL CO., LTD., Osaka (JP); MOCHIDA PHARMACEUTICAL CO., LTD., Tokyo (JP)

( * ) Notice: Subject to any disclaimer, the term of this patent is extended or adjusted under 35 U.S.C. 154(b) by 909 days.

(21) Appl. No.: 17/766,090

(22) PCT Filed: Oct. 2, 2020

(86) PCT No.: PCT/JP2020/037548
§ 371 (c)(1),
(2) Date: Apr. 1, 2022

(87) PCT Pub. No.: WO2021/066144
PCT Pub. Date: Apr. 8, 2021

(65) Prior Publication Data
US 2022/0370404 A1 Nov. 24, 2022

(30) Foreign Application Priority Data

Oct. 4, 2019 (JP) ................................ 2019-184053

(51) Int. Cl.
*A61K 31/353* (2006.01)
*A61P 27/04* (2006.01)
(52) U.S. Cl.
CPC ............ *A61K 31/353* (2013.01); *A61P 27/04* (2018.01)
(58) Field of Classification Search
CPC ............................. A61K 31/353; A61P 27/04
See application file for complete search history.

(56) References Cited

U.S. PATENT DOCUMENTS

| | | | |
|---|---|---|---|
| 2008/0287428 A1* | 11/2008 | Uchida | A61P 17/06 546/175 |
| 2009/0131449 A1 | 5/2009 | Yanni et al. | |
| 2011/0112071 A1 | 5/2011 | Uchida et al. | |
| 2013/0079339 A1 | 3/2013 | Napoletano et al. | |
| 2018/0346436 A1* | 12/2018 | Satoh | A61P 29/00 |
| 2022/0370404 A1 | 11/2022 | Tarui et al. | |

FOREIGN PATENT DOCUMENTS

| | | |
|---|---|---|
| CN | 101228131 A | 7/2008 |
| EP | 1908753 A1 | 4/2008 |
| EP | 3636640 A1 | 4/2020 |
| EP | 1908753 B1 | 12/2024 |
| JP | 2013-523663 A | 6/2013 |
| JP | 7025094 B2 | 2/2022 |
| RU | 2451014 C2 | 5/2012 |
| WO | WO 2007/010383 A1 | 1/2007 |
| WO | WO2018221543 A1 * | 12/2018 ........... C07D 311/58 |

OTHER PUBLICATIONS

Belmonte et al., "TFOS DEWS II pain and sensation report," *The Ocular Surface*, 15(3): 404-437 (2017).
Benetez-Del-Castillo et al., "Safety and Efficacy Clinical Trials for SYL1001, a Novel Short Interfering RNA for the Treatment of Dry Eye Disease," *Invest. Ophthalmol. Vis. Sci.*, 57(14):6447-6454 (2016).
Brazilian National Institute of Industrial Property, Office Action in Brazilian Patent Application No. BR112022005992-2 (Nov. 4, 2024).
Japan Patent Office, Notice of Reasons for Refusal in Japanese Patent Application No. 2022-017196 (Dec. 21, 2022).
Bereiter et al., "TRPV1 and TRPM8 Channels and Nocifensive Behavior in a Rat Model for Dry Eye," *Invest. Ophthalmol. Vis. Sci.*, 59(8): 3739-3746 (2018).
China National Intellectual Property Administration, Office Action in Chinese Patent Application No. 202080069192.5 (May 22, 2024).
Thailand Department of Intellectual Property, Office Action in Thai Patent Application No. 2201002046 (Apr. 29, 2024).
Shiraishi et al., "Dissociation between Subjective Symptoms and Objective Findings of Dry Eye", *New Ophthalmology*, 34(7): 1009-1010 (2017).
Japan Patent Office, Office Action in Japanese Patent Application No. 2022-171542 (Oct. 15, 2024).
Belmonte et al., "TFOR DEWS II pain and sensation report," *The Ocular Surface*, 15(3): 404-437 (2017).
Benitez-Del-Castillo et al., "Safety and Efficacy Clinical Trials for SYL1001, a Novel Short Interfering RNA for the Treatment of Dry Eye Disease," *Invest. Ophthalmol. Vis. Sci.*, 57(14): 6447-6454 (2016).
Inoue et al., "What is dry eye? From causes to the latest treatment," *Pharmacia*, 50(3): 201-206 (2014).
Jimenez et al., "Efficacy of SYL1001 in different animal models of Dry Eye Disease" (ARVO Annual Meeting Abstract), *Invest. Ophthalmol. Vis. Sci.*, 58: 458 (2017).
Kaido et al., "Three cases of short BUT dry eye exhibiting reduced sensitivity to low concentration capsaicin stimulation," *Japan Cornea Conference 2019, Programs and Abstracts of the 43rd Japan Cornea Society and 35th Annual Meeting of Keratoplasty Society of Japan*, p. 88, Abstract P062 (Feb. 7, 2019).

(Continued)

*Primary Examiner* — Paul V Ward
(74) *Attorney, Agent, or Firm* — Leydig, Voit & Mayer, Ltd.

(57) ABSTRACT

This disclosure provides a means for treating dry eye. This disclosure can provide: a composition for use in treating dry eye; and a use thereof. The composition includes (E)-2-(7-trifluoromethyl-chroman-4-ylidene)-N-(7-hydroxy-5,6,7,8-tetrahydronaphthalene-1-yl)acetamide, a pharmaceutically acceptable salt thereof, or a solvate thereof. This disclosure can provide: a composition for treating dry eye; and a use thereof. The composition includes a Vi/Vc zone inhibitor.

10 Claims, 3 Drawing Sheets

(56) References Cited

OTHER PUBLICATIONS

Masuoka, "Role of neurotropic factors in corneal sensory abnormality in dry eye (Research No. S2016-5)," *2016 Result Report for Collaborative Research—Result Report for Encouragement Research of Kanazawa Medical University*, pp. 35-37 (2018).
Tagawa et al., "Dry Eye Treatment Targeting Pain," *Journal of the Eye*, 34(3): 341-346 (2017).
Japanese Patent Office, International Search Report in International Patent Application No. PCT/JP2020/037548 (Dec. 1, 2020).
Brzhesky, "Dry Eye Syndrome Is a Disease of Civilization: Modern Diagnostic and Treatment Options," *Medical Advice*, 2013(3): 114-120 (2013).
Samylina et al., "Biopharmaceutical Aspects of Pharmacopoeial Substances," *Pharmacy*., 2012(8): 29-32 (2012).
Knunyants, "Chemical Encyclopedic Dictionary," pp. 130-131 (1983).
Russian Federal Service for Intellectual Property, Official Action in Russian Patent Application No. 2022111434 (Feb. 28, 2024).
Russian Federal Service for Intellectual Property, Search Report in Russian Patent Application No. 2022111434 (Feb. 28, 2024).
China National Intellectual Property Administration, First Office Action in Chinese Patent Application No. 202080069192.5 (May 16, 2023).
Russian Federal Service for Intellectual Property, Office Action in Russian Patent Application No. 2022111434/04(024063) (Feb. 11, 2025).
Korean Intellectual Property Office, Office Action in Korean Patent Application No. KR 10-2022-7012080 (Sep. 8, 2025).
Moreno-Montañes et al., "Tivanisiran, a Novel siRNA for the Treatment of Dry Eye Disease," Expert Opin. Investig. Drugs, 27(4): 421-426 (2018).

* cited by examiner

*"%" indicates "w/v%"

"%" indicates "w/v%"

//pharmaceutical drug containing heterocyclidene acetamide derivative

PHARMACEUTICAL DRUG CONTAINING HETEROCYCLIDENE ACETAMIDE DERIVATIVE

TECHNICAL FIELD

The present disclosure relates to the field of pharmaceuticals, healthcare, biology, biotechnology, etc. The present disclosure particularly relates to application of a Vi/Vc zone inhibitor and/or improvement in a dry eye symptom.

BACKGROUND ART

It is estimated that there are at least about 8 million dry eye patients in Japan, or about 22 million patients including potential patients who use commercially available eye drops without visiting a hospital, and 1 billion or more worldwide. It is well known that modern society provides more opportunities for gazing at screens from using televisions, computers, mobile terminals, etc., so that the number of blinking has decreased, and the air has dried with use of air conditioners, etc., resulting in increased evaporation of lachrymal fluid to induce dry eye. Refractive surgeries and use of contact lens use also result in dry eye. Examples of symptoms associated with dry eye include ocular discomfort, dryness, burning sensation, irritation, and the like on the ocular surface. More severe forms of dry eye include dry eye induced by destruction of a lachrymal gland due to a disease such as an autoimmune disease such as Sjogren's syndrome and Stevens-Johnson syndrome (Non Patent Literature 1).

The effect of treatments for dry eye is evaluated from external observation or evaluation (objective finding) and a subjective viewpoint of a patient such as ocular discomfort or foreign body sensation (subjective symptom). Objective finding uses the amount of lachrymal fluid and observation of a site of disorder on the keratoconjunctive epithelium as endpoints. While each of sodium hyaluronate, diquafosol sodium, and Rebamipide sold in Japan, and ciclosporin sold in the US have been approved as a prescription eye drop for dry eye, few are approved as an eye drop satisfying improvement in subjective symptoms as a primary endpoint in addition to improvement in objective finding.

CITATION LIST

Non Patent Literature

[NPL 1] Farumashia Vol. 50 No. 3 2014: 201 to 206

SUMMARY OF INVENTION

Solution to Problem

The present disclosure relates to a novel dry eye therapeutic agent using a heterocyclidene acetamide derivative (E)-2-(7-trifluoromethylchroman-4-ylidene)-N-(7-hydroxy-5,6,7,8-tetrahydronaphthalen-1-yl)acetamide, use thereof, a method for treatment or prevention, and the like. The present disclosure also relates to a Vi/Vc zone inhibitor using said compound, use thereof, a method for treatment or prevention, and the like.

Another aspect of the present disclosure relates to a composition for the treatment and/or prevention of dry eye using a Vi/Vc zone inhibitor, use thereof, a method for treatment or prevention, and the like.

The treatment of dry eye can be improvement of a subjective symptom of dry eye. Dry eye treatment can also include improvement of an objective symptom of dry eye. In the present disclosure, dry eye treatment can include improvement of both a subjective symptom and an objective symptom of dry eye.

Examples of the embodiments of the present disclosure include the following.
(Item 1)
A composition for use in treating dry eye, comprising (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof.
(Item 2)
The composition of the preceding item for use in improving a subjective symptom of dry eye.
(Item 2A)
The composition of the preceding item, wherein the dry eye is accompanied by a subjective symptom.
(Item 3)
The composition of any of the preceding items for suppressing ocular discomfort associated with dryness.
(Item 3A)
The composition of any of the preceding items, wherein the dry eye is accompanied by ocular discomfort associated with dryness.
(Item 4)
The composition of any of the preceding items for use in improving an objective symptom of dry eye.
(Item 4A)
The composition of any of the preceding items, wherein the dry eye is accompanied by an objective symptom.
(Item 5)
The composition of any of the preceding items for use in improving a subjective symptom and an objective symptom of dry eye.
(Item 5A)
The composition of any of the preceding items, wherein the dry eye is accompanied by a subjective symptom and an objective symptom.
(Item 6)
The composition of any of the preceding items, wherein a concentration of the (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof is about 0.1 to about 1.0 w/v %.
(Item 7)
The composition of any of the preceding items, which is an eye drop.
(Item 8)
The composition of any of the preceding items, which is a suspension.
(Item 9)
The composition of any of the preceding items, wherein the dry eye is aqueous deficient dry eye.
(Item 10)
The composition of any of the preceding items, characterized in that the composition is administered to a patient who has a subjective symptom of ocular discomfort and has been diagnosed as having dry eye.
(Item 11)
A composition for use in suppressing ocular discomfort associated with dryness, comprising (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof.
(Item 12)
A composition for use in improving a subjective symptom of dry eye, comprising (E)-2-(7-trifluoromethylchroman-4- ylidene)-N-(7-hydroxy-5,6,7,8-tetrahydronaphthalen-1-yl) acetamide or a pharmaceutically acceptable salt or solvate thereof.
(Item 13)
A composition for use in improving an objective symptom of dry eye, comprising (E)-2-(7-trifluoromethylchroman-4-ylidene)-N-(7-hydroxy-5,6,7,8-tetrahydronaphthalen-1-yl) acetamide or a pharmaceutically acceptable salt or solvate thereof.
(Item 14)
A composition for use in treating a corneal epithelial disorder, comprising (E)-2-(7-trifluoromethylchroman-4-ylidene)-N-(7-hydroxy-5,6,7,8-tetrahydronaphthalen-1-yl) acetamide or a pharmaceutically acceptable salt or solvate thereof.
(Item 15)
A suspension for use in suppressing ocular discomfort associated with dryness, comprising about 0.3 to about 1.0 w/v % of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof.
(Item 16)
A Vi/Vc zone inhibitor comprising (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof.
(Item 17)
A composition for use in treating dry eye, comprising a Vi/Vc zone inhibitor.
(Item 18)
The composition of the preceding item for use in improving a subjective symptom of dry eye.
(Item 19)
The composition of any of the preceding items for use in suppressing ocular discomfort associated with dryness.
(Item 20)
The composition of any of the preceding items for use in improving an objective symptom of dry eye.
(Item 21)
The composition of any of the preceding items, which is an eye drop.
(Item 22)
The composition of any of the preceding items, which is a suspension.
(Item 23)
The composition of any of the preceding items, wherein the dry eye is aqueous deficient dry eye.
(Item 24)
The composition of any of the preceding items, characterized in that the composition is administered to a patient who has a subjective symptom of ocular discomfort and has been diagnosed as having dry eye.
(Item 25)
A composition for use in suppressing ocular discomfort associated with dryness, comprising a Vi/Vc zone inhibitor.
(Item 26)
A composition for use in improving a subjective symptom of dry eye, comprising a Vi/Vc zone inhibitor.
(Item 27)
The composition of any of the preceding items, wherein (E)-2-(7-trifluoromethylchroman-4-ylidene)-N-(7-hydroxy-5,6,7,8-tetrahydronaphthalen-1-yl)acetamide is (E)-2-(7-trifluoromethylchroman-4-ylidene)-N-((7R)-7-hydroxy-5,6,7,8-tetrahydronaphthalen-1-yl)acetamide.

Examples of other embodiments of the present disclosure include the following.
(Item A1)
A method of use in treating dry eye in a patient in need thereof, comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A2)
The method of the preceding item for use in improving a subjective symptom of dry eye.
(Item A2A)
The method of the preceding item, wherein the dry eye is accompanied by a subjective symptom.
(Item A3)
The method of any of the preceding items for suppressing ocular discomfort associated with dryness.
(Item A3A)
The method of any of the preceding items, wherein the dry eye is accompanied by ocular discomfort associated with dryness.
(Item A4)
The method of any of the preceding items for use in improving an objective symptom of dry eye.
(Item A4A)
The method of any of the preceding items, wherein the dry eye is accompanied by an objective symptom.
(Item A5)
The method of any of the preceding items for use in improving a subjective symptom and an objective symptom of dry eye.
(Item A5A)
The method of any of the preceding items, wherein the dry eye is accompanied by a subjective symptom and an objective symptom.
(Item A6)
The method of any of the preceding items, wherein the (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof is administered at a concentration of about 0.1 to about 1.0 w/v %.
(Item A7)
The method of any of the preceding items, wherein the compound is administered as an eye drop.
(Item A8)
The method of any of the preceding items, wherein the compound is administered as a suspension.
(Item A9)
The method of any of the preceding items, wherein the dry eye is aqueous deficient dry eye.
(Item A10)
The method of any of the preceding items, characterized in that the composition is administered to a patient who has a subjective symptom of ocular discomfort and has been diagnosed as having dry eye.
(Item A11)
A method of use in suppressing ocular discomfort associated with dryness in a patient in need thereof, comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A12)
A method of use in improving a subjective symptom of dry eye in a patient in need thereof, comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A13)
A method of use in improving an objective symptom of dry eye in a patient in need thereof, comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A14)
A method of use in treating a corneal epithelial disorder in a patient in need thereof, comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A15)
A method for use in suppressing ocular discomfort associated with dryness in a patient in need thereof, comprising administering a suspension comprising about 0.3 to about 1.0 w/v % of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof to the patient.
(Item A16)
A method of use in inhibiting a Vi/Vc zone comprising administering (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof.
(Item A17)
A method of use in treating dry eye in a patient in need thereof, comprising administering a Vi/Vc zone inhibitor.
(Item A18)
The method of the preceding item for use in improving a subjective symptom of dry eye.
(Item A19)
The method of any of the preceding items for use in suppressing ocular discomfort associated with dryness.
(Item A20)
The method of any of the preceding items for use in improving an objective symptom of dry eye.
(Item A21)
The method of any of the preceding items for use in administering the Vi/Vc zone inhibitor as an eye drop.
(Item A22)
The method of any of the preceding items for use in administering the Vi/Vc zone inhibitor as a suspension.
(Item A23)
The method of any of the preceding items, wherein the dry eye is aqueous deficient dry eye.
(Item A24)
The method of any of the preceding items, wherein the Vi/Vc zone inhibitor is administered to a patient who has a subjective symptom of ocular discomfort and has been diagnosed as having dry eye.
(Item A25)
A method of use in suppressing ocular discomfort associated with dryness in a patient in need thereof, comprising administering a Vi/Vc zone inhibitor to the patient.
(Item A26)
A method of use in improving a subjective symptom of dry eye in a patient in need thereof, comprising administering a Vi/Vc zone inhibitor to the patient.
(Item A27)
The method of any of the preceding items, wherein (E)-2-(7-trifluoromethylchroman-4-ylidene)-N-(7-hydroxy-5,6,7,8-tetrahydronaphthalen-1-yl)acetamide is (E)-2-(7-trifluoromethylchroman-4-ylidene)-N-((7R)-7-hydroxy-5,6,7,8-tetrahydronaphthalen-1-yl)acetamide.

Examples of other embodiments of the present disclosure include the following.
(Item B1)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in treating dry eye.
(Item B2)
The compound for use of the preceding item for improving a subjective symptom of dry eye.
(Item B2A)
The compound for use of the preceding item, wherein the dry eye is accompanied by a subjective symptom.
(Item B3)
The compound for use of any of the preceding items for suppressing ocular discomfort associated with dryness.
(Item B3A)
The compound for use of any of the preceding items, wherein the dry eye is accompanied by ocular discomfort associated with dryness.
(Item B4)
The compound for use of any of the preceding items for improving an objective symptom of dry eye.
(Item B4A)
The compound for use of any of the preceding items, wherein the dry eye is accompanied by an objective symptom.
(Item B5)
The compound for use of any of the preceding items for improving a subjective symptom and an objective symptom of dry eye.
(Item B5A)
The compound for use of any of the preceding items, wherein the dry eye is accompanied by a subjective symptom and an objective symptom.
(Item B6)
The compound for use of any of the preceding items, wherein a concentration of the (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof is about 0.1 to about 1.0 w/v %.
(Item B7)
The compound for use of any of the preceding items, which is contained in an eye drop.
(Item B8)
The compound for use of any of the preceding items, which is contained in a suspension.
(Item B9)
The compound for use of any of the preceding items, wherein the dry eye is aqueous deficient dry eye.
(Item B10)
The compound for use of any of the preceding items, wherein the compound is administered to a patient who has a subjective symptom of ocular discomfort and has been diagnosed as having dry eye.
(Item B11)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in suppressing ocular discomfort associated with dryness.
(Item B12)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in improving a subjective symptom of dry eye.

(Item B13)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in improving an objective symptom of dry eye.
(Item B14)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in treating a corneal epithelial disorder.
(Item B15)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for suppressing ocular discomfort associated with dryness, wherein the compound is contained at about 0.3 to about 1.0 w/v % in a composition that is a suspension.
(Item B16)
(E)-2-(7-trifluoromethylchroman-4-ylidene)-N-(7-hydroxy-5,6,7,8-tetrahydronaphthalen-1-yl)acetamide or a pharmaceutically acceptable salt or solvate thereof for use in blocking a Vi/Vc zone.
(Item B17)
A Vi/Vc zone inhibitor for use in treating dry eye.
(Item B18)
The Vi/Vc zone inhibitor for use of the preceding item for improving a subjective symptom of dry eye.
(Item B19)
The Vi/Vc zone inhibitor for use of any of the preceding items for suppressing ocular discomfort associated with dryness.
(Item B20)
The Vi/Vc zone inhibitor for use of any of the preceding items for improving an objective symptom of dry eye.
(Item B21)
The Vi/Vc zone inhibitor for use of any of the preceding items, which is an eye drop.
(Item B22)
The Vi/Vc zone inhibitor for use of any of the preceding items, which is a suspension.
(Item B23)
The Vi/Vc zone inhibitor for use of any of the preceding items, wherein the dry eye is aqueous deficient dry eye.
(Item B24)
The Vi/Vc zone inhibitor for use of any of the preceding items, wherein the inhibitor is administered to a patient who has a subjective symptom of ocular discomfort and has been diagnosed as having dry eye.
(Item B25)
A Vi/Vc zone inhibitor for use in suppressing ocular discomfort associated with dryness.
(Item B26)
A Vi/Vc zone inhibitor for use in improving a subjective symptom of dry eye.
(Item B27)
The compound or Vi/Vc zone inhibitor for use of any of the preceding items, wherein (E)-2-(7-trifluoromethylchroman-4-ylidene)-N-(7-hydroxy-5,6,7,8-tetrahydronaphthalen-1-yl)acetamide is (E)-2-(7-trifluoromethylchroman-4-ylidene)-N-((7R)-7-hydroxy-5,6,7,8-tetrahydronaphthalen-1-yl)acetamide.

Examples of other embodiments of the present disclosure include the following.
(Item C1)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in treating dry eye.
(Item C2)
The use of the preceding item, wherein the medicament is for use in improving a subjective symptom of dry eye.
(Item C2A)
The use of the preceding item, wherein the dry eye is accompanied by a subjective symptom.
(Item C3)
The use of any of the preceding items, wherein the medicament is for use in suppressing ocular discomfort associated with dryness.
(Item C3A)
The use of any of the preceding items, wherein the dry eye is accompanied by ocular discomfort associated with dryness.
(Item C4)
The use of any of the preceding items, wherein the medicament is for use in improving an objective symptom of dry eye.
(Item C4A)
The use of any of the preceding items, wherein the dry eye is accompanied by an objective symptom.
(Item C5)
The use of any of the preceding items, wherein the medicament is for use in improving a subjective symptom and an objective symptom of dry eye.
(Item C5A)
The use of any of the preceding items, wherein the dry eye is accompanied by a subjective symptom and an objective symptom.
(Item C6)
The use of any of the preceding items, wherein a concentration of the (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the medicament is about 0.1 to about 1.0 w/v %.
(Item C7)
The use of any of the preceding items, wherein the medicament is an eye drop.
(Item C8)
The use of any of the preceding items, wherein the medicament is a suspension.
(Item C9)
The use of any of the preceding items, wherein the dry eye is aqueous deficient dry eye.
(Item C10)
The use of any of the preceding items, characterized in that the medicament is administered to a patient who has a subjective symptom of ocular discomfort and has been diagnosed as having dry eye.
(Item C11)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in suppressing ocular discomfort associated with dryness.
(Item C12)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in improving a subjective symptom of dry eye.
(Item C13)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in improving an objective symptom of dry eye.
(Item C14)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in treating a corneal epithelial disorder.
(Item C15)
Use of a suspension comprising about 0.3 to about 1.0 w/v % of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in suppressing ocular discomfort associated with dryness.
(Item C16)
Use of (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof in the manufacture of a medicament for use in inhibiting a Vi/Vc zone.
(Item C17)
Use of a Vi/Vc zone inhibitor in the manufacture of a medicament for use in treating dry eye.
(Item C18)
The use of the preceding item, wherein the medicament is for use in improving a subjective symptom of dry eye.
(Item C19)
The use of any of the preceding items, wherein the medicament is for use in suppressing ocular discomfort associated with dryness.
(Item C20)
The use of any of the preceding items, wherein the medicament is for use in improving an objective symptom of dry eye.
(Item C21)
The use of any of the preceding items, wherein the medicament is an eye drop.
(Item C22)
The use of any of the preceding items, wherein the medicament is a suspension.
(Item C23)
The use of any of the preceding items, wherein the dry eye is aqueous deficient dry eye.
(Item C24)
The use of any of the preceding items, characterized in that the medicament is administered to a patient who has a subjective symptom of ocular discomfort and has been diagnosed as having dry eye.
(Item C25)
Use of a Vi/Vc zone inhibitor in the manufacture of a medicament for use in suppressing ocular discomfort associated with dryness.
(Item C26)
Use of a Vi/Vc zone inhibitor in the manufacture of a medicament for use in improving a subjective symptom of dry eye.
(Item C27)
The use of any of the preceding items, wherein (E)-2-(7-trifluoromethylchroman-4-ylidene)-N-(7-hydroxy-5,6,7,8-tetrahydronaphthalen-1-yl)acetamide is preferably (E)-2-(7-trifluoromethylchroman-4-ylidene)-N-((7R)-7-hydroxy-5,6,7,8-tetrahydronaphthalen-1-yl)acetamide.

Advantageous Effects of Invention

The present disclosure provides novel means for preventing and/or treating dry eye, and can preferably materialize improvement of a subjective symptom and more preferably improvement of both a subjective symptom and an objective symptom. The composition or method of the present disclosure can provide treatment with an immediate effect on dry eye.

DESCRIPTION OF EMBODIMENTS

Hereinafter, the present disclosure is described. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. The terms used herein should also be understood as being used in the meaning that is commonly used in the art, unless specifically noted otherwise. Thus, unless defined otherwise, all terminologies and scientific technical terms that are used herein have the same meaning as the general understanding of those skilled in the art to which the present disclosure pertains. In case of a contradiction, the present specification (including the definitions) takes precedence.

Definitions

As used herein, "about" refers to a range of ±10% from the numerical value that is described subsequent to "about", unless noted otherwise.

As used herein, "subject" refers to the target of administration (implantation) of a drug or method for the treatment and prevention of the present disclosure. Examples of subjects include mammals (e.g., humans, mice, rats, hamsters, rabbits, cats, dogs, cows, horses, sheep, monkeys, etc.), but primates are preferable and humans are particularly preferable.

As used herein, "or" is used when "at least one or more" of the listed matters in the sentence can be employed. When explicitly described herein as "within the range" of "two values", the range also includes the two values themselves.

As used herein, "treatment (therapy)" refers to healing or improvement of a disease or a symptom, or suppression or alleviation of a symptom. "Treating dry eye" encompasses treatment of an objective symptom or subjective symptom.

As used herein, "prevention" (prophylaxis) refers to the prevention of expression of a disease or a symptom in advance. This concept also encompasses delaying the expression of a disease or symptom and minimizing the expression of a disease or symptom by treatment prior to onset or the like.

As used herein, "pharmaceutically acceptable salt" refers to an inorganic or organic acid addition salt of the compound of the present disclosure that is relatively non-toxic. These salts can be prepared by reacting a compound which is purified temporarily between the final isolation and purification of the compound or in a free base form separately with a suitable organic or inorganic salt, and isolating a salt formed in this manner.

As used herein, "solvate" refers to a solvate of the compound of the present disclosure or a pharmaceutically acceptable salt thereof, encompassing, for example, a solvate of an organic solvent (e.g., alcohol (ethanol or the like)-ate), hydrate, and the like. When forming a hydrate, this can be coordinated with any number of water molecules. Examples of hydrates include monohydrates, dihydrates, and the like.

As used herein, "dry eye" refers to a disease diagnosed as "dry eye" in accordance with clinical diagnostic criteria, and is defined as "a multifactor disease of a lachrymal fluid and ocular surface due to various factors, associated with ocular discomfort, abnormality in the visual function, instability in the tear film, or disorder on the ocular surface". Dry eye is typically diagnosed by observing that BUT from fluorescein staining is 5 seconds or less and the patient has a subjective symptom (ocular discomfort or abnormality in the visual function).

As used herein, "subjective symptom" refers to a symptom that can be sensed by a patient suffering from the disease among symptoms of the disease.

As used herein, "objective symptom" refers to a symptom that can be objectively proven by findings from image finding/numerical values of a test result (objective finding) or the like among symptoms of the disease.

As used herein, "ocular discomfort" refers to a symptom in which an eye is uncomfortable or an eye constantly feels uneasy.

As used herein, "ocular discomfort associated with dryness" refers to ocular discomfort caused by dryness such as low humidity, which does not include ocular pain.

As used herein, "aqueous deficient dry eye" refers to dry eye with reduced amount of lachrymal fluid, developed due to destruction of lachrymal gland tissue or lachrymal fluid drainage disorder from the lachrymal gland to the ocular surface from Sjogren's syndrome, aging, graft-versus-host disease (GVHD), or the like.

As used herein, "inhibition" of a target refers to reduction or elimination of a phenomenon occurring within the body due to the target of inhibition. "Antagonism" refers to a form of "inhibition" achieved by a inhibiting action due to competition with a molecule (ligand, substrate, etc.) that naturally interacts therewith.

As used herein, "inhibit a Vi/Vc zone" refers to reduction or elimination of nerve excitation in the Vi/Vc zone of the medulla oblongata, i.e., signaling in response to nociception.

As used herein, "Vi/Vc zone inhibitor" refers to an agent for blocking the Vi/Vc zone. Examples of "Vi/Vc zone inhibitor" include any substance, agent, means, and the like that reduces or eliminates nerve excitation in the Vi/Vc zone in comparison to the absence of the substance, agent, or means having such an action.

As used herein, "kit" refers to a unit providing parts to be provided (e.g., therapeutic drug or medicament, prophylactic drug or medicament, the respective ingredients thereof, user manual, and the like) which are generally separated into two or more segments.

As used herein, "instruction" refers to a document with an explanation of the method of use of the present disclosure for physicians or other users.

(Compound)

The present disclosure can provide a composition comprising (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof or a method of use thereof. (E)-2-(7-trifluoromethylchroman-4-ylidene)-N-(7-hydroxy-5,6,7,8-tetrahydronaphthalen-1-yl) acetamide includes an R form (CAS. No. 920332-28-1), S form (CAS. No. 920332-29-2), and racemate (CAS. No. 920332-27-0), but an R form ((E)-2-(7-trifluoromethylchroman-4-ylidene)-N-((7R)-7-hydroxy-5,6,7,8-tetrahydronaphthalen-1-yl)acetamide (also referred to as compound (1) in the present disclosure)) is more preferable.

A pharmaceutically acceptable salt of the compound of the present disclosure is not particularly limited, as long as it is a salt that is pharmaceutically acceptable. Specific examples thereof include those with hydrochloric acid, hydrobromic acid, hydroiodic acid, sulfuric acid, nitric acid, phosphoric acid, and other mineral acids; formic acid, acetic acid, propionic acid, butyric acid, valeric acid, enanthic acid, capric acid, myristic acid, palmitic acid, stearic acid, lactic acid, sorbic acid, mandelic acid, and other aliphatic monocarboxylic acids, benzoic acid, salicylic acid, and other aromatic monocarboxylic acids, oxalic acid, malonic acid, succinic acid, fumaric acid, maleic acid, malic acid, tartaric acid, and other aliphatic dicarboxylic acids, citric acid and other aliphatic tricarboxylic acids, and other organic carboxylic acids; methanesulfonic acid, ethanesulfonic acid, 2-hydroxyethanesulfonic acid, and other aliphatic sulfonic acids, benzenesulfonic acid, p-toluenesulfonic acid, and other aromatic sulfonic acids, and other organic sulfonic acids; acid addition salts with an acidic amino acid such as aspartic acid or glutamic acid, or the like, salts with metal such as alkali earth metal or alkali metal such as sodium, potassium, magnesium, or calcium, salts with an organic base such as methylamine, ethylamine, ethanolamine, pyridine, lysine, arginine, or ornithine, ammonium salt, and the like.

These salts can be obtained by a routine method, e.g., mixing an equivalent amount of a group of compounds of the present disclosure with a solution comprising a desired acid or base and the like, and filtering out a desired salt, or evaporating a solvent to collect the salt. The compound of the present disclosure or a salt thereof can form a solvate with a solvent such as water, ethanol, or glycerol.

(E)-2-(7-trifluoromethylchroman-4-ylidene)-N-(7-hydroxy-5,6,7,8-tetrahydronaphthalen-1-yl)acetamide has an excellent Transient Receptor Potential Vanilloid 1 (denoted as "TRPV1" hereinafter; TRPV1 is also referred to as "Vanilloid Receptor 1" (VR1)) antagonizing action.

References are made to International Publication No. WO 2007/010383, Japanese Patent No. 4754566, Japanese Patent No. 6230743, and International Publication No. WO 2018/221543 for the R form (compound (1)), S form, or racemate of (E)-2-(7-trifluoromethylchroman-4-ylidene)-N-(7-hydroxy-5,6,7,8-tetrahydronaphthalen-1-yl)acetamide. The R form (compound (1)), S form, or racemate can be manufactured by a manufacturing method described in said publications. The content described in said publications is incorporated herein by reference in its entirety.

TRPV1 is a TRP channel, which is cloned as a cationic channel responding to capsaicin from the dorsal root ganglion (DRG), has sensitivity to heat of 43° C. or higher and proton, and is studied as a primary molecule of nociception (The Journal of Japanese Biochemical Society, Vol. 85, No. 7: 561-565). It is known that TRPV1 increases its activity and elicits hyperalgesia upon inflammation or tissue injury. For this reason, TRPV1 has drawn attention as a candidate for a drug target that can be used for pain treatment.

It has been reported in the past that TRPV1 antagonists exhibit efficacy on various pain models for inflammatory pain, neuropathic pain, osteoarthritis, or the like (The Journal of Japanese Biochemical Society, Vol. 85, No. 7: 561-565).

The Examples of the present disclosure show that (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof can be used as a Vi/Vc zone inhibitor. The present disclosure can provide a Vi/Vc zone inhibitor comprising (E)-2-(7-trifluoromethylchroman-4-ylidene)-N-(7-hydroxy-5,6,7,8-tetrahydronaphthalen-1-yl)acetamide or a pharmaceutically acceptable salt or solvate thereof. Since (E)-2-(7-trifluoromethylchroman-4-ylidene)-N-(7-hydroxy-5,6,7,8-tetrahydronaphthalen-1-yl)acetamide has Vi/Vc zone inhibiting activity, the compound can be used for improvement of a subjective symptom of dry eye, and an effect on ocular discomfort associated with dryness in particular can be expected, as described in detail elsewhere herein.

(Dry Eye)

The present disclosure can provide a composition, pharmaceutical/medicament, method, and the like for use in preventing and/or treating dry eye. The present disclosure shows that (E)-2-(7-trifluoromethylchroman-4-ylidene)-N-(7-hydroxy-5,6,7,8-tetrahydronaphthalen-1-yl)acetamide (can be a pharmaceutically acceptable salt or solvate thereof or the like) can be used in the treatment of dry eye. The present disclosure shows that a Vi/Vc zone inhibitor can be used for the treatment of dry eye in another embodiment. While treatment or prevention of dry eye treated with the composition of the present disclosure is not particularly limited, examples thereof include improvement of a subjective symptom or improvement of an objective symptom.

(Improvement of Subjective Symptom)

In one embodiment, the composition, pharmaceutical/medicament, or method of the present disclosure can be for improvement of a subjective symptom of dry eye. In another embodiment, the composition, pharmaceutical/medicament, or method of the present disclosure can be for improvement of dry eye accompanied by a subjective symptom. The composition of the present disclosure can improve ocular discomfort, dryness, visual function, eye strain, foreign body sensation, photophobia, or blurred vision, which is not particularly limited thereto, by improving a subjective symptom. The composition of the present disclosure preferably improves ocular discomfort or dryness, and more preferably improves ocular discomfort from the viewpoint of more effectively suppressing weak stimulation.

(Ocular Discomfort)

In one embodiment, the composition of the present disclosure can suppress ocular discomfort. Ocular discomfort suppressed by the composition of the present disclosure can be caused by dryness, inflammation, instability of tear film, or the like, but the cause is not particularly limited thereto. The composition of the present disclosure preferably suppresses ocular discomfort associated with dryness from the viewpoint of having a better therapeutic effect.

(Improvement of Objective Symptom)

In one embodiment, the composition, pharmaceutical/medicament, or method of the present disclosure can be for improvement of an objective symptom of dry eye. In another embodiment, the composition, pharmaceutical/medicament, or method of the present disclosure can be for improvement of dry eye accompanied by an objective symptom. Improvement of an objective symptom of dry eye can include change or improvement in the value of a Schirmer's test, fluorescein staining test, tear break up time (BUT) test, number of blinks, or the like. The composition of the present disclosure can improve superficial punctate keratitis (SPK), tear break up time (BUT), tear secretion, hyperaemia, or keratoconjunctival epithelial disorder, which is not particularly limited thereto, by improving an objective symptom. The composition of the present disclosure preferably improves superficial punctate keratitis (SPK) from the viewpoint of having a better therapeutic effect.

(Improvement of Subjective Symptom and Objective Symptom)

In a preferred embodiment, the composition, pharmaceutical/medicament, or method of the present disclosure can be for improvement of both a subjective symptom and an objective symptom of dry eye. In another preferred embodiment, the composition, pharmaceutical/medicament, or method of the present disclosure can be for improvement of dry eye accompanied by both a subjective symptom and an objective symptom. A subjective symptom and an objective symptom can be any subjective symptom and objective symptom described elsewhere herein. Although not wishing to be bound by any theory, the composition of the present disclosure, in a preferred embodiment, can be advantageous in that a subjective symptom and an objective symptom can be improved, treated, or suppressed at once.

(Corneal Epithelial Disorder)

In another aspect, the composition of the present disclosure can treat a corneal epithelial disorder. A corneal epithelial disorder treated with the composition of the present disclosure is a disease involving damage (i.e., wound or defect) of a corneal epithelial cell. Examples thereof include, but are not particularly limited to, corneal epithelial disorders due to an endogenous disease such as a decrease in lachrymal fluid, Sjogren's syndrome, Stevens-Johnson syndrome, or xerophthalmia (dry eye), or a post-operative, drug-induced, lesion-induced, or contact lens use-induced exogenous disease and the like. The composition of the present disclosure can also promote corneal wound healing.

(Types of Dry Eye)

While several classification methods of dry eye have been proposed, dry eye is primarily classified as "aqueous deficient type", "increased evaporative type", and "short BUT type". Aqueous deficient dry eye is dry eye developed due to destruction of lachrymal gland tissue or lachrymal fluid drainage disorder from the lachrymal gland to the ocular surface from Sjogren's syndrome, aging, graft-versus-host disease (GVHD), or the like. A severe corneal epithelial disorder is often developed in patients with severe aqueous deficient dry eye ("Yomeba Wakaru! Wakareba Kawaru! Doraiai Shinryo [*Understand from reading! Change from understanding! Dry eye diagnosis and treatment*], Publisher: MEDICAL VIEW CO., LTD., published on Oct. 1, 2017, pages 46-58" and "Senmonkai no Tameno Ganka Shinryo Kuorifai 19 Doraiai Supesharisuto heno Michi [*Qualification for ophthalmic diagnosis and treatment for specialists 19 Road to dry eye specialist*], Publisher: Nakayama Shoten Co., Ltd, published on Nov. 5, 2013, pages 103-106"). Meanwhile, increased evaporative dry eye is dry eye with a normal tear secretion function, but is developed by excessive loss of moisture from the ocular surface exposed by decreased blinking or the like due to meibomian gland dysfunction, incomplete eyelid closure such as lagophthalmos, operation of VDT (Visual Display Terminals), or the like. Short BUT dry eye is dry eye with a short BUT and a subjective symptom of dry eye, but tear secretion and keratoconjunctival epithelium are mostly normal. (Revised Definition and Diagnostic Criteria of Dry Eye (2016), and Journal of the Eye, Publisher: Medical-Aoi Publications, March 2017 Edition, pages 309-313"). Dry eye that can be treated or prevented by the composition of the present disclosure includes, but is not particularly limited to, aqueous deficient dry eye, increased evaporative dry eye, and short BUT dry eye. From the viewpoint of having a better therapeutic effect, the composition of the present disclosure preferably treats aqueous deficient dry eye.

(Blocking of Vi/Vc Zone)

When an eye is forcibly dried in a normal animal, a nerve excitation marker, i.e., c-Fos positive cell count, is increased in the Vi/Vc zone of the medulla oblongata. Thus, it is understood that a nerve through the Vi/Vc zone is involved in ocular discomfort associated with dryness (The Journal of Neuroscience, Apr. 28, 2004/24 (17): 4224-4232). The c-Fos positive cell count in the Vi/Vc zone of the medulla oblongata is also increased in an exorbital lacrimal gland extracted rat dry eye model, which is an aqueous deficient dry eye model (Neuroscience. 2015. 290. 204-213). Thus, a nerve through the Vi/Vc zone is involved in ocular discomfort associated with dryness in a subjective symptom of aqueous deficient dry eye.

Spinal trigeminal nucleus are classified into subnucleus oralis (Vo), subnucleus interpolaris (Vi), and subnucleus caudalis (Vc) and relay nociceptive or non-nociceptive signaling for pain, tactile sensation, or the like from the oral cavity and face region. Stimulation in a cornea is transmitted primarily through a pathway in the Vc/c1 region or Vi/Vc zone (J Neurophysiol. 1997 January; 77(1): 43-56.). The region that reacts varies depending on the type of stimulation. It is known that the Vc/c1 region reacts to nociceptive stimulation such as heat or capsaicin, i.e., strong stimulation (Headache. 2012 February; 52(2): 262-273 and "Sansashinkeiryoiki heno Kapusaishin Shigeki ni yoru Shingaijuyo ni taisuru Esutorojen no Eikyo [*Effect of estrogen on nociception from capsaicin stimulation to the trigeminal nerve region*]", Kazuaki Yamagata, Osaka University thesis), while the Vi/Vc zone reacts to weak stimulation such as dryness (The Journal of Neuroscience, Apr. 28, 2004-24 (17): 4224-4232).

Most currently approved eye drops that are approved as a prescription eye drop for dry eye improve objective symptoms. An eye drop that directly treats subjective symptoms in addition to objective symptoms does not exist, as far as the applicant is aware. For this reason, a dry eye treating eye drop that improves both objective symptoms and subjective symptoms is extremely desirable.

The composition of the present disclosure can be characterized in that the composition is administered to a patient who has a subjective symptom of ocular discomfort and has been diagnosed as having dry eye. The composition of the present disclosure can be characterized in that the composition is administered to a patient who has an objective symptom of superficial punctate keratitis (SPK) and has been diagnosed as having dry eye.

(Vi/Vc Zone Inhibitor)

One aspect of the present disclosure can provide a Vi/Vc zone inhibitor. The Vi/Vc zone inhibitor of the present disclosure can change signaling in response to nociception in the Vi/Vc zone. For example, after nociception, the c-Fos expressing cell count in the Vi/Vc zone can be reduced. In a behavioral experiment related to memory or anxiety, elevated c-Fos expression was observed after about 30 minutes at the mRNA level and after 1 to 2 hours at the protein level in neurons reacting to stimulation. c-Fos is used as an indicator of activity of neurons.

Examples of Vi/Vc zone inhibitors include a substance that suppresses excitation of the Vi/Vc zone and a substance that suppresses the function of the Vi/Vc zone. Meanwhile, Vi/Vc zone inhibitors also include combinations of a plurality of substances that materialize blocking of excitation of the Vi/Vc zone and the like. A Vi/Vc zone inhibitor can be a Vi/Vc zone inhibiting compound in the present disclosure. Representative examples of Vi/Vc zone inhibiting compounds include, but are not limited to, the compounds described in (Vi/Vc zone blocking compound) provided in the present disclosure (e.g., (E)-2-(7-trifluoromethylchroman-4-ylidene)-N-(7-hydroxy-5,6,7,8-tetrahydronaphthalen-1-yl)acetamide and compound (1), pharmaceutically acceptable salt or solvate thereof, and the like). Examples of substances that can be used as a Vi/Vc zone inhibitor also include other biomolecules with an identified function such as antibodies and nucleic acids and the like.

Other examples of Vi/Vc zone inhibitors include means for genetic modification to suppress excitation or function of a Vi/Vc zone, cells having activity to suppress excitation or function of a Vi/Vc zone, and the like. The Vi/Vc zone inhibitor of the present disclosure can also be effective for a disease, condition, or the like for which a modulation of a Vi/Vc zone is useful.

Examples of substances that suppress excitation of the Vi/Vc zone and substances that suppress the function of the Vi/Vc zone include low molecular compounds, high molecular compounds, nucleic acids, and antibodies that suppress excitation of a Vi/Vc zone, low molecular compounds, high molecular compounds, nucleic acids, and antibodies that suppress a function of a Vi/Vc zone, and the like.

(Vi/Vc zone Inhibiting Compound)

An embodiment of the present disclosure provides a compound that can be used as a Vi/Vc zone inhibitor. Examples of compounds that can be used as a Vi/Vc zone inhibitor include the (E)-2-(7-trifluoromethylchroman-4-ylidene)-N-(7-hydroxy-5,6,7,8-tetrahydronaphthalen-1-yl) acetamide and compound (1) described herein, and pharmaceutically acceptable salts and solvates thereof.

A pharmaceutically acceptable salt of a compound that can be used as a Vi/Vc zone inhibitor is not particularly limited, as long as it is a salt that is pharmaceutically acceptable. Specific examples thereof include those with hydrochloric acid, hydrobromic acid, hydroiodic acid, sulfuric acid, nitric acid, phosphoric acid, and other mineral acids; formic acid, acetic acid, propionic acid, butyric acid, valeric acid, enanthic acid, capric acid, myristic acid, palmitic acid, stearic acid, lactic acid, sorbic acid, mandelic acid, and other aliphatic monocarboxylic acids, benzoic acid, salicylic acid, and other aromatic monocarboxylic acids, oxalic acid, malonic acid, succinic acid, fumaric acid, maleic acid, malic acid, tartaric acid, and other aliphatic dicarboxylic acids, citric acid and other aliphatic tricarboxylic acids, and other organic carboxylic acids; methanesulfonic acid, ethanesulfonic acid, 2-hydroxyethanesulfonic acid, and other aliphatic sulfonic acids, benzenesulfonic acid, p-toluenesulfonic acid, and other aromatic sulfonic acids, and other organic sulfonic acids; acid addition salts with an acidic amino acid such as aspartic acid or glutamic acid, or the like, salts with metal such as alkali earth metal or alkali metal such as sodium, potassium, magnesium, or calcium, salts with an organic base such as methylamine, ethylamine, ethanolamine, pyridine, lysine, arginine, or ornithine, ammonium salt, and the like.

(Use of Vi/Vc Zone Inhibitor)

One aspect of the present disclosure can provide a composition for use in preventing or treating dry eye, comprising a Vi/Vc zone inhibitor or a pharmaceutical/medicament or method using the same. A composition comprising a Vi/Vc zone inhibitor or a pharmaceutical/medicament or method using the same can be for improvement of a subjective symptom of dry eye such as suppression of ocular discomfort associated with dryness. A composition comprising a Vi/Vc zone inhibitor or a method using the same can also be for improvement of dry eye. A composition comprising a Vi/Vc zone inhibitor can be an eye drop. A composition comprising a Vi/Vc zone inhibitor can be a suspension. Aqueous deficient dry eye can be targeted for treatment as dry eye. A composition comprising a Vi/Vc zone inhibitor can be characterized in that the composition is administered to a patient who has a subjective symptom of ocular discomfort and has been diagnosed as having dry eye. The present disclosure can provide a composition for suppressing ocular discomfort associated with dryness, comprising a Vi/Vc zone inhibitor. The present disclosure can also provide a composition for improving a subjective symptom of dry eye, comprising a Vi/Vc zone inhibitor.

Another aspect can provide a composition for suppressing or improving ocular discomfort associated with dryness, comprising a Vi/Vc zone inhibitor or a pharmaceutical/medicament or method using the same. In this application, the target patient does not need to have been diagnosed as having dry eye. The present disclosure found that ocular discomfort can be suppressed or improved by modulating a Vi/Vc zone, resulting in providing such an application.

It is understood that a subjective symptom (e.g., ocular discomfort associated with dryness) of dry eye, especially aqueous deficient dry eye, is sensed particularly through the Vi/Vc zone, so that such a symptom can be improved with a Vi/Vc zone inhibitor. In addition, the Examples herein show that a Vi/Vc zone inhibitor can provide an improvement of an objective symptom of dry eye (e.g., SPK (superficial punctate keratitis)).

(Dosage Form)

The composition of the present disclosure can be formulated into a suitable dosage form. For example, the composition of the present disclosure, when used as an ophthalmic composition, can be provided as an ophthalmic injection, ophthalmic ointment, eye drops, or ophthalmic perfusate. The composition can be formulated into any dosage form such as aerosol, liquid agent, extract, elixir, capsule, granule, pill, ointment, powder, tablet, solution, suspension, or emulsion.

For example, an ophthalmic composition can be provided in a form of a suspension prepared by suspending an active ingredient into an aqueous solvent (e.g., phosphate buffered saline) or in a form of a liquid agent prepared by dissolving an active ingredient into an aqueous solvent (e.g., phosphate buffered saline). The composition of the present disclosure can be an eye drop. The composition of the present disclosure can be a suspension.

The composition of the present disclosure can be administered through any suitable route determined by those skilled in the art. The composition can be formulated to be suitable for administration through a route of administration selected from, but is not limited to, ocular injection, topical application (including application to an eye), eye drop, intravenous injection, intravenous drip, oral administration, parenteral administration, transdermal administration, and the like.

(Additive and/or Excipient)

The composition can comprise any pharmaceutically acceptable additive and/or excipient that is known in the art. Examples of additives include, but are not limited to, stabilizers, pH modifiers, buffer, preservatives, and surfactants.

Examples of stabilizers include sodium hydrogen sulfite and the like. The amount thereof is preferably 0 to about 1 w/v % with respect to the entire amount of the composition.

Examples of pH modifiers include acids such as carbonic acid, acetic acid, and citric acid, as well as alkali metal hydroxides such as potassium hydroxide, alkali metal carbonates or bicarbonates such as sodium carbonate, alkali metal acetate such as sodium acetate, alkali metal citrate such as sodium citrate, other bases, and the like. The amount thereof is preferably 0 to 20 w/v % with respect to the entire amount of the composition.

Examples of preservatives include sorbic acid, potassium sorbate, paraoxybenzoate esters such as methyl paraoxybenzoate, ethyl paraoxybenzoate, propyl paraoxybenzoate, and butyl paraoxybenzoate, quaternary ammonium salts such as chlorhexidine gluconate, benzalkonium chloride, benzethonium chloride, and cetylpyridinium chloride, alkylpolyaminoethylglycine, chlorobutanol, polyquad, polyhexamethylene biguanide, chlorhexidine, and the like. The amount thereof can be appropriately changed depending on the type, but is, for example, 0 to about 0.2 w/v % with respect to the entire amount of the composition.

Examples of surfactants include, but are not particularly limited to, non-ionic surfactants, anionic surfactants, cationic surfactants, and the like. A surfactant is preferably a non-ionic surfactant from the viewpoint of being less toxic.

Examples of non-ionic surfactants include, but are not particularly limited to, polyoxyethylene (40) monostearate (polyoxyl 40 stearate), sorbitan sesquioleate, polyoxyethylene (20) sorbitan monooleate (polysorbate 80), and the like.

Examples of anionic surfactants include, but are not particularly limited to, alkylbenzene sulfonate, alkyl sulfate, alkyl polyoxyethylene sulfates, aliphatic α-sulfomethyl ester, α-olefin sulfonic acid, and the like.

Examples of cationic surfactants include, but are not particularly limited to, benzalkonium chloride, benzethonium chloride, and the like.

Examples of surfactant content include, but are not particularly limited to, 0 to about 1.0 w/v % with respect to the entire amount of composition.

Eye drops can be prepared, for example, by dissolving or suspending the desired component described above in an aqueous solvent such as sterile purified water, saline, or buffer (e.g., phosphate buffer, citric acid buffer, acetic acid buffer, etc.) or a non-aqueous solvent such as vegetable oil such as cottonseed oil, soybean oil, sesame oil, or peanut oil, adjusting the osmotic pressure to a predetermined osmotic pressure, and applying sterilization such as mechanical sterilization. When a suspension is prepared, a surfactant can be included therein.

An ophthalmic ointment can comprise an ointment base in addition to the various components described above upon preparation. Examples of the ointment base include, but are not particularly limited to, oily bases such as petroleum jelly, liquid paraffin, and polyethylene, water soluble bases such as emulsion bases prepared from emulsifying an oil phase and an aqueous phase with a surfactant or the like, and the like.

The composition, therapeutic agent, or prophylactic agent of the present disclosure can be provided as a kit. In a specific embodiment, the present disclosure provides a drug pack or kit comprising one or more containers filled with one or more components of the composition or drug of the present disclosure. Optionally, information indicating approval for manufacture, use, or sale for human administration by a government agency regulating the manufacture, use, or sale of drugs/medicaments or biological products can be displayed on such containers in a form specified by the government agency.

(Kit)

As used herein, "kit" is used when providing a composition, which should not be provided in a mixed state for stability or the like and is preferably used by mixing immediately prior to use, but the kit is not particularly limited thereto. Such a kit advantageously comprises an instruction or user manual describing how the provided parts (e.g., therapeutic drug or prophylactic drug) are used or how the reagents should be processed. When a kit is used herein as a reagent kit, the kit generally comprises an instruction or the like describing the method of use of the therapeutic agent, prophylactic agent, or the like.

(Instruction)

As used herein, "instruction" provides, for example, description for the method of detection of the present disclosure, how to use a diagnostic drug, or instruction for administration of a drug, or the like, but the description is not limited thereto. The instruction may have a description instructing administration to the eye as a site of administration (e.g., by eye drop instillation, ophthalmic ointment, injection, etc.) The instruction is prepared in accordance with a format specified by a regulatory authority of the country in which the present disclosure is practiced (e.g., Ministry of Health, Labour and Welfare in Japan, Food and Drug Administration (FDA) in the U.S., or the like), with an explicit description showing approval by the regulatory authority. An instruction is a so-called package insert or label. An instruction is generally provided in paper media, but is not limited thereto. An instruction can also be provided in a form such as electronic media (e.g., web sites provided on the Internet or emails).

(Description in the Package Insert)

Indication and the like (which can include characteristics of target patient or target disease, disorder, or symptom), dosing method, dosage and administration, and precautions can be described in instructions in a package insert (label in the US, etc.) in light of the information based on clinical trials provided in the present disclosure.

(Route of Administration)

In one embodiment, utilization methods of the present disclosure include, for example, an eye drop, but the methods are not limited thereto. Examples thereof include modes of administration (administration methods and dosage forms) such as ophthalmic ointment, injection into the anterior chamber, impregnation into a sustained release agent, subconjunctival injection, and systemic administration (oral administration and intravenous injection).

(Dose)

The concentration of the compound of the present disclosure is not particularly limited, but is generally about 0.1 to about 100000 µM (µmol/l). From the viewpoint of having a better effect with less toxicity, the concentration is preferably about 0.5 to about 80000 µM. From the viewpoint of having a more significant effect, the concentration is more preferably about 5 to about 80000 µM, still more preferably about 50 to about 75000 µM, particularly preferably about 500 to about 70000 µM, even more preferably about 2000 to about 50000 µM, and most preferably about 5000 to about 30000 µM. Examples of other concentration ranges generally include, but are not limited to, about 0.1 to about 1 µM, about 1 to about 10 µM, about 10 to about 100 µM, about 100 to about 1000 µM, about 1000 to about 2000 µM, about 2000 to about 4000 µM, about 4000 to about 7000 µM, about 7000 to about 10000 µM, about 10000 to about 12000 µM, about 12000 to about 15000 µM, about 15000 to about 20000 µM, about 20000 to about 22000 µM, about 22000 to about 25000 µM, about 25000 to about 30000 µM, about 30000 to about 40000 µM, about 40000 to about 50000 µM, about 50000 to about 70000 µM, about 70000 to about 85000 µM, and about 85000 to about 100000 µM. The concentration range can be determined by appropriately combining these upper limits and lower limits.

The concentration of the compound of the present disclosure is not particularly limited, but is about 0.00001 to about 5.0 w/v %. From the viewpoint of having a better effect with less toxicity, the concentration is preferably about 0.00003 to about 3.0 w/v %. From the viewpoint of having a more significant effect, the concentration is more preferably about 0.0003 to about 3.0 w/v %, still more preferably about 0.003 to about 2.0 w/v %, particularly preferably about 0.03 to about 1.5 w/v, even more preferably about 0.1 to about 1.0 w/v %, and most preferably about 0.3 to about 1.0 w/v %. The compound of the present disclosure can be effective at a broad range of concentrations. Other examples of concentrations of the compound of the present disclosure include about 0.00001 to about 0.0001 w/v %, about 0.0001 to about 0.001 w/v %, about 0.001 to about 0.01 w/v %, about 0.01 to about 0.02 w/v %, about 0.02 to about 0.05 w/v %, about 0.05 to about 0.1 w/v %, about 0.1 to about 0.2 w/v %, about 0.2 to about 0.3 w/v %, about 0.3 to about 0.4 w/v %, about 0.4 to about 0.5 w/v %, about 0.5 to about 0.6 w/v %, about 0.6 to about 0.7 w/v %, about 0.7 to about 0.8 w/v %, about 0.8 to about 0.9 w/v %, about 0.9 to about 1 w/v q, about 1 to about 1.1 w/v %, about 1.1 to about 1.2 w/v %, about 1.2 to about 1.3 w/v %, about 1.3 to about 1.4 w/v, about 1.4 to about 1.5 w/v %, and the like. The concentration range can be determined by appropriately combining these upper limits and lower limits.

Examples of the concentration of an eye drop include, but are not particularly limited to, about 0.00001 to about 5.0 w/v %. From the viewpoint of having a better effect with less toxicity, the concentration is preferably about 0.00003 to about 3.0 w/v %. From the viewpoint of having a more significant effect, the concentration is more preferably about 0.0003 to about 3.0 w/v %, still more preferably about 0.003 to about 2.0 w/v %, particularly preferably about 0.03 to about 1.5 w/v %, even more preferably about 0.1 to about 1.0 w/v %, and most preferably about 0.3 to about 1.0 w/v %. The compound of the present disclosure can be effective at a broad range of concentrations. Other examples of concentrations of the compound of the present disclosure include about 0.00001 to about 0.0001 w/v %, about 0.0001 to about 0.001 w/v %, about 0.001 to about 0.01 w/v a, about 0.01 to about 0.02 w/v %, about 0.02 to about 0.05 w/v %, about 0.05 to about 0.1 w/v %, about 0.1 to about 0.2 w/v %, about 0.2 to about 0.3 w/v %, about 0.3 to about 0.4 w/v %, about 0.4 to about 0.5 w/v %, about 0.5 to about 0.6 w/v %, about 0.6 to about 0.7 w/v %, about 0.7 to about 0.8 w/v %, about 0.8 to about 0.9 w/v %, about 0.9 to about 1 w/v %, about 1 to about 1.1 w/v, about 1.1 to about 1.2 w/v %, about 1.2 to about 1.3 w/v %, about 1.3 to about 1.4 w/v %, about 1.4 to about 1.5 w/v %, and the like. The concentration range can be determined by appropriately combining these upper limits and lower limits.

The effective amount of the drug of the present disclosure, which is effective in treating a specific disease, disorder, or condition, can vary depending on the property of the disorder or condition, but can be determined with a standard clinical technology based on the descriptions herein by those skilled in the art. Furthermore, identification of the optimal dosage range can be optionally assisted by using an in vitro assay. Since the precise dose to be used in a compound can vary depending on the route of administration or severity of a disease or disorder, the dose should be determined in accordance with the judgment of a physician or status of each patient. The dosage is not particularly limited, but can be, for example, 0.001, 1, 5, 10, 15, 100, or 1000 mg/kg body weight per dosing or within a range of two of such values.

(Sustainability)

The sustainability of the effect upon administration of the composition of the present disclosure is not particularly limited, but is 12 hours. From the viewpoint of attaining a better therapeutic effect, sustainability is preferably 8 hours, and more preferably 4 hours.

(Immediacy of Effect)

The immediacy of the effect upon administration of the composition of the present disclosure is not particularly limited, but an effect is observed in 5 minutes to 2 hours. From the viewpoint of attaining a better therapeutic effect, the immediacy of effect is preferably 10 minutes to 1 hour, more preferably 20 minutes to 50 minutes, and still more preferably 30 minutes.

(Dosing Interval)

The dosing interval is not particularly limited, but a composition can be administered at a common dosing interval, such as 1 to 6 times a day. From the viewpoint of attaining a better effect and improved compliance of patients, the dosing interval is preferably 2 to 5 times a day, and more preferably 2 to 4 times a day. The dosage, number of doses, dosing interval, dosing period, and dosing method can be appropriately selected depending on the patient's age or body weight, symptom, mode of administration, target organ, or the like. For example, the composition of the present disclosure can be used as an eye drop. Further, a therapeutic drug preferably comprises an active ingredient at a therapeutically effective amount or an amount effective to exert a desired action. The effective dose can be estimated from a dose-response curve obtained from an in vitro or animal model test system.

In one embodiment, the present disclosure can have a description on dosage and administration, such as "used on a patient who has a subjective symptom of ocular discomfort and has been diagnosed as having dry eye", "used on a patient who has an objective symptom of superficial punctate keratitis (SPK) and has been diagnosed as having dry eye", or "used on a patient who has a keratoconjunctival epithelial disorder and has been diagnosed as having dry eye".

(General Technology)

The molecular biological methodology, biochemical methodology, and microbiological methodology used herein are well known and conventionally used in the art, which are described, for example, in Sambrook J. et al. (1989). Molecular Cloning: A Laboratory Manual, Cold Spring Harbor and its 3rd Ed. (2001); Ausubel, F. M. (1987). Current Protocols in Molecular Biology, Greene Pub. Associates and Wiley-Interscience; Ausubel, F. M. (1989). Short Protocols in Molecular Biology: A Compendium of Methods from Current Protocols in Molecular Biology, Greene Pub. Associates and Wiley-Interscience; Innis, M. A. (1990). PCR Protocols: A Guide to Methods and Applications, Academic Press; Ausubel, F. M. (1992). Short Protocols in Molecular Biology: A Compendium of Methods from Current Protocols in Molecular Biology, Greene Pub. Associates; Ausubel, F. M. (1995). Short Protocols in Molecular Biology: A Compendium of Methods from Current Protocols in Molecular Biology, Greene Pub. Associates; Innis, M. A. et al. (1995). PCR Strategies, Academic Press; Ausubel, F. M. (1999). Short Protocols in Molecular Biology: A Compendium of Methods from Current Protocols in Molecular Biology, Wiley, and annual updates; Sninsky, J. J. et al. (1999). PCR Applications: Protocols for Functional Genomics, Academic Press, Gait, M. J. (1985). Oligonucleotide Synthesis: A Practical Approach, IRL Press; Gait, M. J. (1990). Oligonucleotide Synthesis: A Practical Approach, IRL Press; Eckstein, F. (1991). Oligonucleotides and Analogues: A Practical Approach, IRL Press; Adams, R. L. et al. (1992). The Biochemistry of the Nucleic Acids, Chapman & Hall; Shabarova, Z. et al. (1994). Advanced Organic Chemistry of Nucleic Acids, Weinheim; Blackburn, G. M. et al. (1996). Nucleic Acids in Chemistry and Biology, Oxford University Press; Hermanson, G. T. (1996). Bioconjugate Techniques, Academic Press, Bessatsu Jikken Igaku [*Experimental Medicine, Supplemental Volume*], "Idenshi Donyu & Hatsugen Kaiseki Jikken Ho [*Experimental Methods for Transgenesis & Expression Analysis*]", Yodosha, 1997, or the like. Relevant portions thereof (which may be the entire document) are incorporated herein by reference.

Reference literatures such as scientific literatures, patents, and patent applications cited herein are incorporated herein by reference to the same extent that the entirety of each document is specifically described.

The present disclosure has been described while showing preferred embodiments to facilitate understanding. While the present disclosure is described hereinafter based on the Examples, the above descriptions and the following Examples are provided for the sole purpose of exemplification, not limitation of the present disclosure. Thus, the scope of the present disclosure is not limited to the embodiments and Examples that are specifically described herein and is limited only by the scope of claims.

EXAMPLE

Examples of the present disclosure are described hereinafter. Biological samples or the like, where applicable, were handled in compliance with the standards enacted by the Ministry of Health, Labour and Welfare, Ministry of Education, Culture, Sports, Science and Technology, or the like and, where applicable, based on the Declaration of Helsinki or ethical codes prepared based thereon.

Test Example 1

Effect of 0.3 w/v % compound (1) in a rat scopolamine-induced dry eye model
(Animal Used)
Male SD rats purchased from Charles River Laboratories Japan (body weight upon arrival: 254.6 g to 281.5 g) were used. Animals were raised in a breeding facility set to a room temperature of 23° C.±3° C., humidity of 55% RH±10% RH, and 12 hour illumination (lights turned on at 08:00 and turned off at 20:00), from after arrival to the completion date of the test. Animals were fed a solid feed (product name: Labo MR Stock, Nosan Corporation) by ad libitum feeding. Tap water through an animal drinking water sterilization device was made freely available with an automatic water supplying device. The test was conducted with an approval from an animal experiment ethics committee under the Act on Welfare and Management of Animals (Act No. 105 of Oct. 1, 1973; final revision: Act No. 46 on May 30, 2014).
(Tested Substance)
Compound (1) was used as the tested substance. Compound (1) suspended in a vehicle shown in Table 1 so that the concentration would be 0.3 w/v % was used as a suspension eye drop. A compound (1)-free vehicle eye drop consisting of only a vehicle (Table 1) was used as a control group.

TABLE 1

| Component | Content (in 100 mL of formulation) | |
|---|---|---|
| | Vehicle | 0.3 w/v % compound (1) |
| Compound (1) | — | 0.3 g |
| Polysorbate 80 | 0.1 g | 0.1 g |
| Phosphate buffered saline | Suitable amount | Suitable amount |
| Total amount | 100 mL (pH 7.15) | 100 mL (pH —) |

(Test Method)
(Preparation of Rat Scopolamine-Induced Dry Eye Model)
Scopolamine hydrobromide trihydrate (Tokyo Chemical Industry) was dissolved into saline (Otsuka Pharmaceutical Factory) so that the concentration would be 208.3 mg/mL (hereinafter, SC solution). The SC solution was loaded into an osmotic pump (product name: Alzet® osmotic pump (model number: 2ML4), DURECT Corporation).
The hair between the left and right shoulder blades of a rat was shaved (near the implanted osmotic pump). General anesthesia was administered through inhalation of isoflurane (product name: Forane, Abbott Japan). The shaved part was alternatingly disinfected with 10% isodine solution (product name: Isodine Solution® 10%, Mundipharma) and 70% ethanol, and then the skin was incised with a cutting blade while placing a sterilized drape on the site to be incised. An osmotic pump was implanted after inserting tweezers into the incision and peeling off subcutaneous connective tissue from the blood vessels to create a pocket with a size at which the osmotic pump can be implanted. Subcutaneous connective tissue was sutured in accordance with the width of the incision wound by using an absorbable suture (product name: Vicryl, suture thickness: J463, Johnson & Johnson).

The skin was then sutured in accordance with the width of the incision wound using a silk suture (product name: silk blade suture with a needle, product number: F17-30, Natsume Seisakusho). 0.05 mg/kg of buprenorphine hydrochloride injection (product name: Lepetani injection 0.3 mg, Otsuka Pharmaceutical) was subcutaneously administered once to care for post-surgery pain, and 20000 units/rat of benzylpenicillin potassium (product name: PENICILLIN G POTASSIUM 200,000 UNITS FOR INJECTION, Meiji Seika Pharma) was subcutaneously administered once to prevent infections, each at a site away from an incision wound.
(Post-Operative Management)
After implanting the osmotic pump, 0.05 mg/kg of buprenorphine hydrochloride injection and 20000 units/rat of benzylpenicillin potassium were each subcutaneously administered once at a site away from the surgical site on the next day and the date after next.
(Administration)
For a total of 14 days from day 8 to day 21 after implanting the osmotic pump, a vehicle eye drop or 0.3 w/v % compound (1) suspension eye drop was administered. 5 μL of eye drop was administered to the right eye using a micropipette, 4 times a day with an interval of 2 hours or longer. A vehicle eye drop was administered to the Sham group.
(Observation of Superficial Punctate Keratitis (SPK))
5 μL of 0.1% fluorescein sodium solution (hereinafter, FL solution) was administered using a micropipette under general anesthesia through inhalation of isoflurane. After administering several droplets of saline as eye drops to wash away excessive FL solution, the cornea was observed in three separate sections of top, middle, and bottom using a slit lamp (Topcon) and given a score of 0 to 3 points each for a total full score of 9 points in accordance with Table

TABLE 2

| Point | Determination criteria |
|---|---|
| 0 | No punctate staining |
| 1 | Sparse density of punctate staining (punctate staining is separated) |
| 2 | Moderate density of punctate staining (between 1 to 3 points) |
| 3 | High density of punctate staining (punctate staining is nearly adjacent) |

(Preparation of Zamboni's Fixative)
$NaH_2PO_4.2H_2O$ (Nacalai Tesque Inc.), $Na_2HPO_4.12H_2O$ (Wako Pure Chemical Industries, Ltd.), paraformaldehyde (Wako Pure Chemical Industries, Ltd.), and 2,4,6,-Trinitrophenol (Picric acid, Kishida Chemical Co., Ltd.) were dissolved in ultrapure water so that the final concentration would be 0.3%, 2.9%, 2%, and 0.1%, respectively, to prepare Zamboni's Fixative.
(Measurement of c-Fos Positive Cell Count)
After observing SPK after 14 days (after 22 days post-surgery) from administration of a vehicle eye drop or 0.3 w/v % compound (1) suspension eye drop, general anesthesia was administered by inhalation of isoflurane. After a rat was allowed to bleed to death by perfusion of saline, Zamboni's Fixative was perfused to extract the medulla oblongata. After sectioning the extracted medulla oblongata, the medulla oblongata was stained by immunohistochemical staining by using an anti-c-Fos antibody (product name: Rabbit Anti-Human c-Fos Polyclonal Antibody, sc-52, Santa Cruz Biotechnology, Inc.). A specimen was observed under a fluorescence microscope to measure the number of cells with high stain intensity among cells stained with an anti-c-Fos antibody within the Vi/Vc zone.
(Results)

Figure 1:
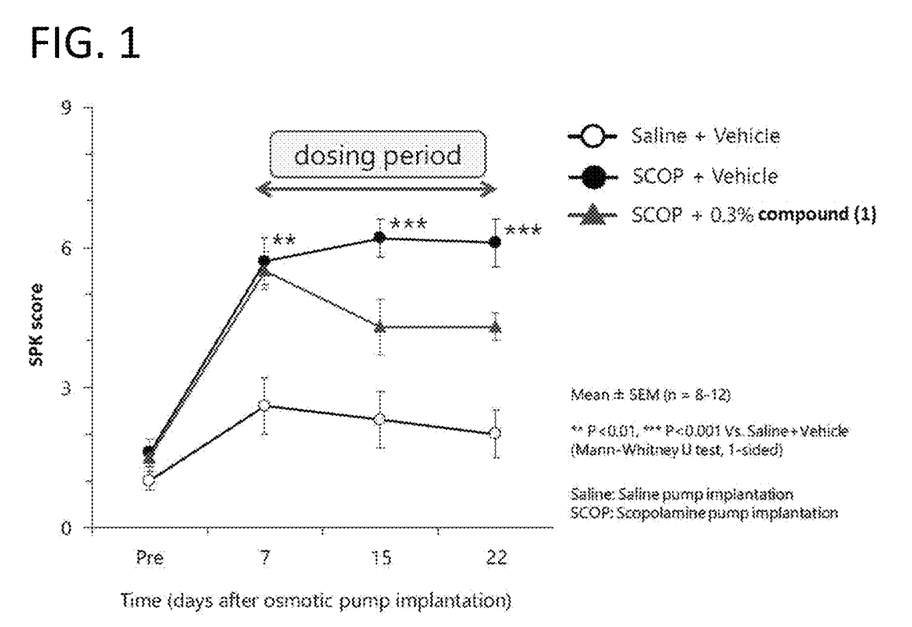
FIG. 1 is a diagram showing changes in the superficial punctate keratitis (SPK) score in a rat after drug administration. The 0.3% w/v compound (1) suspension eye drop significantly reduced the SPK score after 7 days from administration (after 15 days post-surgery) in comparison to a Vehicle eye drop, and the effect thereof was sustained after 14 days from administration (after 22 days post-surgery). A rat scopolamine induced dry eye model is denoted as SCOP, and a model loaded with saline instead of scopolamine is denoted as Saline.

FIG. 1 shows the effect on SPK, and Table 3 shows the effect on the c-Fos positive cell count in the Vi/Vc zone of the medulla oblongata. 0.3 w/v % compound (1) suspension eye drop significantly reduced the SPK score after 7 days from administration (after 15 days post-surgery) compared to a vehicle eye drop, and the effect thereof was sustained 14 days after administration (22 days post-surgery). Thus, it was demonstrated that compound (1) improves objective symptoms.

0.3 w/v % compound (1) suspension eye drop also reduced the c-Fos positive cell count in the Vi/Vc zone of the medulla oblongata compared to a vehicle eye drop. Thus, it was demonstrated that compound (1) blocks the Vi/Vc zone.

TABLE 3

| | | c-Fos positive cell count (cells/section) |
|---|---|---|
| | Sham group | 2.2 ± 0.2 |
| SCOP model | Vehicle group | 14.7 ± 6.9 |
| | 0.3 w/v % compound (1) | 8.8 ± 3.8 |

Test Example 2 Dose Response of Compound (1) with Respect to the Number of Blinks Under a Dry Environment in a Rat Scopolamine-Induced Dry Eye Model (Animal Used)

Male SD rats purchased from Charles River Laboratories Japan (body weight upon arrival: 253.1 g to 273.0 g) were used. Animals were raised in a breeding facility set to a room temperature of 23° C.±3° C., humidity of 55% RH±10% RH, and 12 hour illumination (lights turned on at 08:00 and turned off at 20:00), from after arrival to breeding date under a low humidity environment. Animals were fed a solid feed (product name: Labo MR Stock, Nosan Corporation) by ad libitum feeding. Tap water through an ultrafiltration device was made freely available in a water bottle. The test was conducted with an approval from an animal experiment ethics committee under the Act on Welfare and Management of Animals (Act No. 105 of Oct. 1, 1973; final revision: Act No. 46 on May 30, 2014)
(Tested Substance)

Compound (1) was used as a tested substance. In the same manner as Test Example 1, compound (1) was suspended in a buffer to prepare suspension eye drops with a concentration of compound (1) of 0.1 w/v %, 0.3 w/v %, and 1.0 w/v %. A compound (1)-free vehicle eye drop consisting of only a vehicle was also prepared as a control group.
(Test Method)
(Preparation of a Rat Scopolamine-Induced Dry Eye Model)

A rat scopolamine-induced dry eye model was prepared by the same method as Test Example 1.
(Low Humidity Environment)

After about 2.5 hours from implanting an osmotic pump, dry air supplied from an air compressor was sent into an experiment chamber (SJ-1500N, Natsume Seisakusho) to create a low humidity environment (20% RH or lower).
(Administration)

5 μL of a vehicle eye drop or 0.1 w/v %, 0.3 w/v %, or 1.0 w/v % compound (1) suspension eye drop was administered once to the right eye using a micropipette, 0.5 hours before measuring the number of blinks.
(Measurement of Number of Blinks)

After 8 days or more from starting raising the rats in a low humidity environment, the rats were taken out from a breeding cage. The animals were placed in a cage comprised of chain link fencing on all sides (behavior measurement environment cage) to facilitate measurement of the number of blinks. After acclimation for 0.5 hours under a normal environment, the behavior measurement environment cage was transferred to an experiment chamber, and the number of blinks of the right eye of rats was measured for 5 minutes under a low humidity environment. A test was conducted in four separate phases using the same animals after a drug withdrawal period of 2 days or more (crossover test).
(Results)

Figure 2:
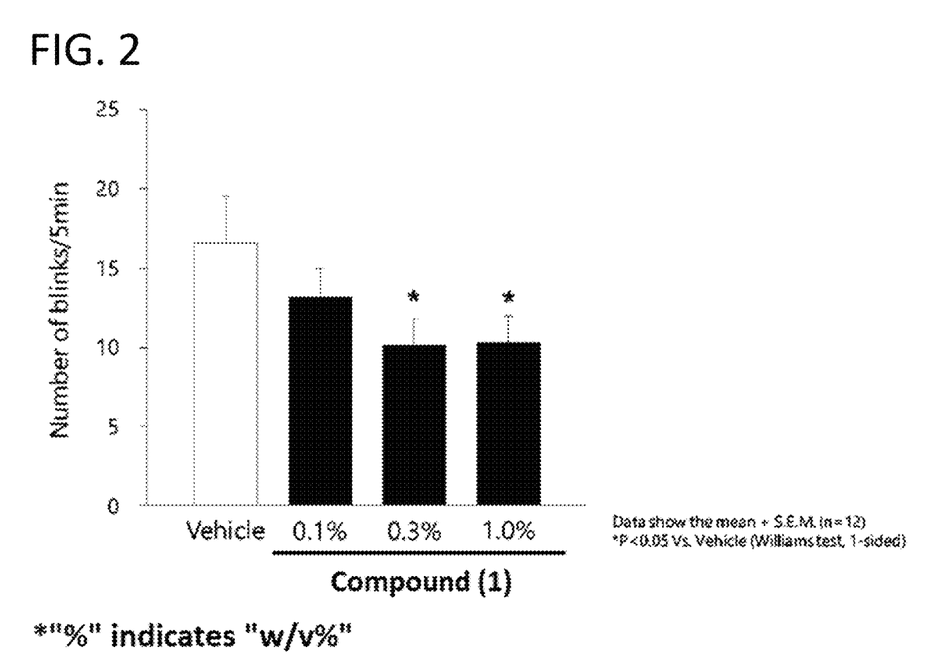
FIG. 2 is a diagram showing the number of blinks within 5 minutes, after 0.5 hours from administration of a Vehicle eye drop or a 0.1 w/v %, 0.3 w/v %, or 1.0 w/v % compound (1) suspension eye drop. Compound (1) reduced the number of blinks in the range from 0.1 w/v % to 1.0 w/v %, and a significant effect was observed at 0.3 w/v % and 1.0 w/v %.

The results are shown in FIG. 2. Compound (1) reduced the number of blinks in the range from 0.1 w/v % to 1.0 w/v %, and a significant effect was observed at 0.3 w/v % and 1.0 w/v %. Therefore, it was demonstrated that compound (1) improves a subjective symptom in a broad range of concentrations.

Text Example 3 Sustainability of Compound (1) with Respect to the Number of Blinks Under Dry Environment in a Rat Scopolamine-Induced Dry Eye Model By using the same evaluation method as Text Example 2, the sustainability of an effect of improving a subjective symptom was examined. The number of blinks of the right eye was measured for 5 minutes under a lower humidity condition after 0.5 hours from single administration of vehicle eye drop or after 0.5, 4, or 8 hours from single administration of 1.0 w/v % compound (1) suspension eye drop.

Figure 3:
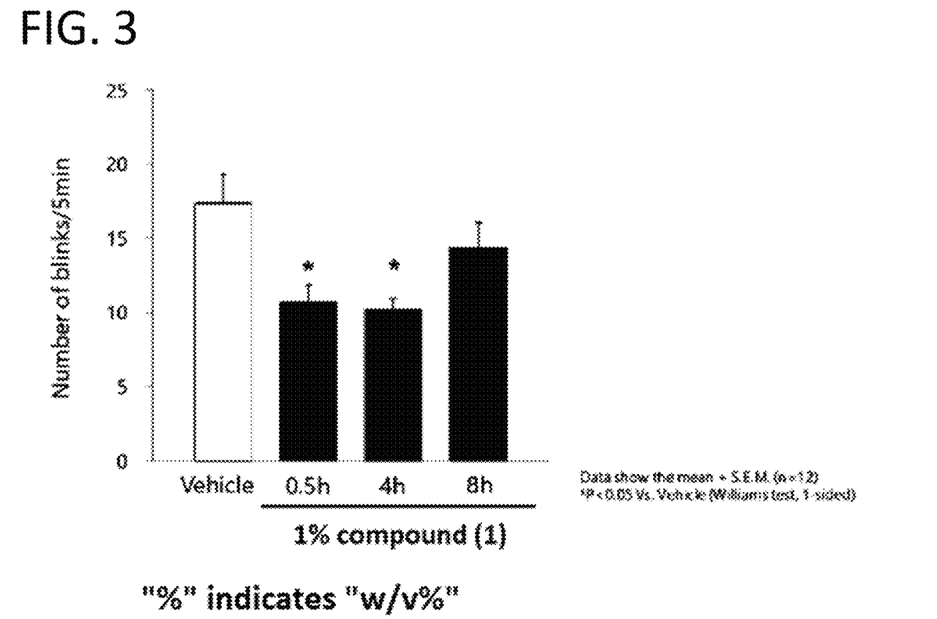
FIG. 3 is a diagram showing the number of blinks within 5 minutes, after 0.5 hours from a single administration of a vehicle eye drop or after 0.5, 4, or 8 hours from a single administration of 1.0 w/v % compound (1) suspension eye drop. The number of blinks after 0.5, 4, and 8 hours from administration of a 1.0 w/v % compound (1) suspension eye drop can be reduced to a lower number than the number of blinks after 0.5 hours from administration of a vehicle eye drop. In particular, the number of blinks after 0.5 and 4 hours was significantly reduced.

The results are shown in FIG. 3. The number of blinks after 0.5, 4, and 8 hours from administration of 1.0 w/v % compound (1) suspension eye drop can be reduced to less than the number of blinks after 0.5 hours from administration of a vehicle eye drop, and the number of blinks was reduced significantly, particularly after 0.5 and 4 hours. Thus, it was demonstrated that compound (1) maintains an effect of improving a subject symptom for a long period of time.

Text Example 4 Long-Term Administration Test in a Rat Scopolamine-Induced Dry Eye Model 1.0 w/v % compound (1) suspension eye drop was administered for an extended period using a rat scopolamine-induced dry eye model prepared by the same method as Test Example 2. The model was treated under a low humidity environment (20% RH or less) only when measuring the number of blinks.

After one week has passed from implanting an osmotic pump, 1.0 w/v % compound (1) suspension eye drop and a vehicle eye drop were repeatedly administered for 8 days. 5 μL of 1.0 w/v % compound (1) suspension eye drop and vehicle eye drop was administered to the right eye 4 times a day by using a micropipette.

An effect of improving SPK (SPK score) was evaluated by the same method as Test Example 1 on day 8 of sample administration. The number of blinks of the right eye was measured for 5 minutes under a low humidity environment after 4 hours from the initial administration on day 7 of administration (2 weeks post-surgery) by the same method as Text Example 2.

Figure 4:
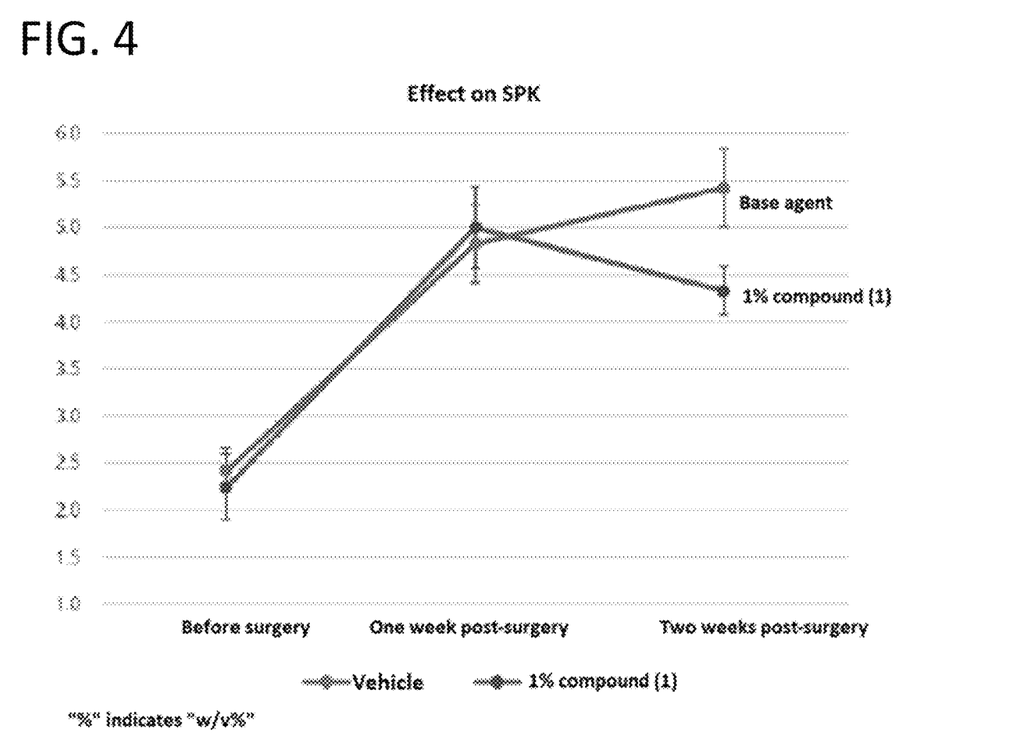
FIG. 4 is a diagram showing changes in the SPK score in a rat after 8 days of repeated administration of a vehicle eye drop or 1.0 w/v % compound (1) suspension eye drop. The 1.0 w/v % compound (1) suspension eye drop reduced the SPK score after 7 days from administration (after 15 days post-surgery) in comparison to the vehicle eye drop.

FIG. 4 shows the effect on SPK. 1.0 w/v % compound (1) suspension eye drop significantly reduced the SPK score compared to a vehicle eye drop.

Figure 5:
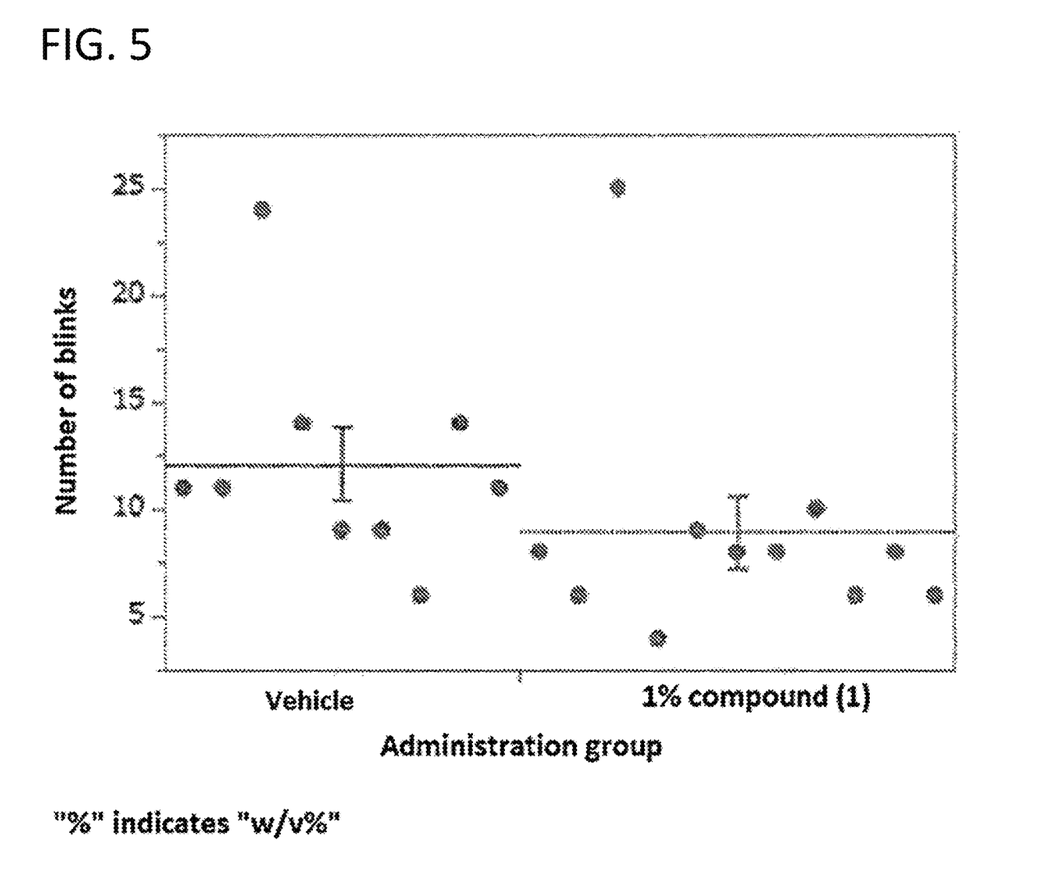
FIG. 5 is a diagram showing the number of blinks within 5 minutes in a rat after 8 days of repeated administration of a vehicle eye drop or 1.0 w/v % compound (1) suspension eye drop. The 1.0 w/v % compound (1) suspension eye drop reduced the number of blinks in comparison to the vehicle eye drop.

FIG. 5 shows the effect on the number of blinks under a low humidity environment. 1.0 w/v % compound (1) suspension eye drop reduced the number of blinks compared to a vehicle eye drop.

(Discussion)

The results in Table 3 of Test Example 1 herein demonstrate that compound (1) has an effect of blocking the Vi/Vc zone. FIG. 1 of Test Example 1 and FIGS. 2 and 3 of Test Examples 2 and 3 demonstrate that compound (1) has an effect of improving an objective symptom and a subjective symptom. Thus, it was demonstrated that compound (1) has a dry eye treating effect.

Although not certain, it is inferred that compound (1) was able to improve an objective symptom and a subjective symptom, which is a therapeutic effect on dry eye, by having an action to block the Vi/Vc zone. Specifically, it is inferred that dry eye can be treated by blocking the Vi/Vc zone.

Test Example 5: Clinical Test Example (Measured Endpoints)
Primary Endpoints
Safety and Tolerability of Compound (1)

Measurement of the number and severity of adverse events including an abnormal change in clinical test results, vital signs, and physical and ophthalmic test/pharmacokinetic (PK) profiles $C_{max}$, $t_{max}$, $AUC_{0-last}$, $AUC_{0-\infty}$, $t_{last}$, $AUC_{\%\ extrap}$, $t_{1/2}$, $MRT_{0-last}$, $MRT_{0-\infty}$, Vd/F, and CL/F of compound (1)

Efficacy of Compound (1)

Difference between compound (1) and placebo with respect to a change in dry eye symptoms (visual analogue scale [VAS])
Secondary Endpoints
Efficacy of Compound (1)

Change in dry eye symptom (CFS score (superior, inferior, temporal, nasal, and total), lissamine green staining score of the conjunctiva, lid wiper epitheliopathy score, tear breakup time (TBUT))

Change in dry eye symptom (VAS, Ocular Surface Disease Index [OSDI®], 5-Item Dry Eye Questionnaire [DEQ-5] score)

(Protocol)
(A) Single Administration

Suitable subjects are screened. Subjects are randomized to receive a single administration of a placebo or a specific concentration of compound (1) eye drop.

Blood for PK measurement is collected at predetermined points in time before administration and after administration. For evaluation of safety of the eye and the entire body after administration, the measured endpoints described above are evaluated.

(B) Multiple Administrations

Suitable subjects are screened. Subjects are randomized to receive administration of a placebo or a specific concentration of compound (1) eye drop. Multiple doses are administered over a specific period.

For evaluation of safety of the eye and the entire body after administration, the measured endpoints described above are evaluated.

Test Example 6: Vi/Vc Modulation Action

A rat scopolamine-induced dry eye model is prepared as described in Test Example 1. For a total of 14 days from day 8 to day 21 after implanting the osmotic pump, a vehicle eye drop or eye drop containing a test compound is administered. 5 μL of eye drop is administered to the right eye using a micropipette, 4 times a day with an interval of 2 hours or longer.

After 14 days from administration of a vehicle eye drop or eye drop containing a test compound (after 22 days post-surgery), general anesthesia was administered by inhalation of isoflurane. After a rat was allowed to bleed to death by perfusion of saline, Zamboni's Fixative was perfused to extract the medulla oblongata. After sectioning the extracted medulla oblongata, the medulla oblongata was stained by immunohistochemical staining by using an anti-c-Fos antibody (product name: Rabbit Anti-Human c-Fos Polyclonal Antibody, sc-52, Santa Cruz Biotechnology, Inc.). A specimen was observed under a fluorescence microscope to measure the number of cells with high stain intensity among cells stained with an anti-c-Fos antibody within the Vi/Vc zone.

The Vi/Vc zone modulation function of the test compound is checked by the same method as Test Example 1.

(Note)

As described above, the present disclosure is exemplified by the use of its preferred embodiments. However, it is understood that the scope of the present disclosure should be interpreted solely based on the Claims. It is also understood that any patent, any patent application, and any references cited herein should be incorporated herein by reference in the same manner as the contents are specifically described herein. The present application claims priority to Japanese Patent Application No. 2019-184053 filed on Oct. 4, 2019 with the Japan Patent Office. The entire content thereof is incorporated herein by reference in the same manner as if the contents are specifically described herein.

INDUSTRIAL APPLICABILITY

The present disclosure can be used in the field of medicine, pharmaceuticals, healthcare, biology, biochemistry, and the like.

The invention claimed is:

1. A method for treating dry eye in a patient in need thereof, comprising administering a suspension comprising about 0.3 w/v % of (E)-2-(7-trifluoromethylchroman-4-ylidene)-N-((7R)-7-hydroxy-5,6,7,8-tetrahydronaphthalen-1-yl)acetamide or a pharmaceutically acceptable salt or solvate thereof to the patient.

2. The method of claim 1, wherein the dry eye is accompanied by a subjective symptom.

3. The method of claim 2, wherein the dry eye is accompanied by ocular discomfort associated with dryness.

4. The method of claim 1, wherein the dry eye is accompanied by an objective symptom.

5. The method of claim 1, wherein the dry eye is accompanied by a subjective symptom and an objective symptom.

6. The method of claim 1, wherein the suspension is administered as an eye drop.

7. The method of claim 1, wherein the dry eye is aqueous deficient dry eye.

8. The method of claim 1, wherein the patient has a subjective symptom of ocular discomfort and has been diagnosed as having dry eye.

9. A method for suppressing ocular discomfort associated with dryness in a patient in need thereof, comprising administering a suspension comprising about 0.3 w/v % of (E)-2-(7-trifluoromethylchroman-4-ylidene)-N-((7R)-7-hydroxy-5,6,7,8-tetrahydronaphthalen-1-yl) acetamide or a pharmaceutically acceptable salt or solvate thereof to the patient.

10. The method of claim 9, wherein the suspension is administered as an eye drop.

* * * * *